Patented Sept. 14, 1948

2,449,071

UNITED STATES PATENT OFFICE 2,449,071

CATALYST FOR THE SYNTHESIS OF HYDROCARBONS

Charles O. Hawk, Norma R. Stern, and Lawrence J. E. Hofer, Pittsburgh, Pa., assignors to the United States of America, as represented by the Secretary of the Interior No Drawing. Application November 7, 1945, Serial No. 627,271

12 Claims. (Cl. 260—449.6)

(Granted under the act of March 3, 1883, as amended April 30, 1928; 370 O. G. 757)

The invention herein described and claimed may be manufactured and used by or for the Government of the United States of America for governmental purposes without the payment of any royalties thereon or therefor.

This invention relates to the production of hydrocarbons from carbon monoxide and hydrogen, and more particularly to catalysts for accomplishing the reaction between carbon monoxide and hydrogen.

It is an object of this invention to produce new iron oxide catalysts which are suitable for the production of hydrocarbons containing more than one carbon atom per molecule from mixtures of hydrogen and carbon monoxide. Another object is to produce new iron oxide catalysts which preferentially induce the formation of hydrocarbons having more than one carbon atom per molecule rather than the formation of methane. Other objects will be apparent or will appear hereinafter.

As used herein, the term "iron oxide catalyst" is intended to apply to the catalyst comprising essentially iron oxides in any degree of hydration, both before and after conditioning with hydrogen or other reducing gas. Depending upon the extent of reduction during the conditioning period, such catalysts may contain various oxides and mixtures of oxides of iron, as well as metallic iron, in varying proportions.

The use of catalysts containing iron for initiating the synthesis of aliphatic hydrocarbons from mixtures of hydrogen and carbon monoxide has been the subject of a number of patent specifications. The addition of varying percentages of both easily reducible and difficultly reducible metallic oxides to ferric or ferrous oxide is mentioned in these disclosures as resulting in catalysts possessing superior activity. Preparation by methods employing thermal decomposition of iron carbonyl to iron, and by methods of treating promoted iron or iron oxide under such conditions of temperature that "sintering" or even fusion occurs, have also been proposed.

We have been unable to find, prior to our invention, any disclosure of the preparation from precipitated iron oxides of an unpromoted ferric oxide catalyst having the properties and/or composition which are hereinafter described.

It is stated in the literature that more than one type of ferric oxide, corresponding to more or less definite composition with respect to water of constitution and exhibiting differences in color, crystal size and crystal structure is obtainable by precipitation from solutions of ferric salts. One of these oxides is sometimes designated as the ortho form, which is red-brown in color, and the other as the meta form, which is yellow in color.

The red-brown form is non-crystalline and has been considered by some to exist in several degrees of hydration, the one containing the most water corresponding to the formula, $Fe_2O_3.5H_2O$. Others claim that no definite hydrates are associated wtih this form. All agree, however, and it has been corroborated by us in preparing iron catalysts for the synthesis of hydrocarbons from hydrogen and carbon monoxide, that in this form iron oxide is associated with relatively large quantities of water and as a result, exhibits the properties of a gel. In the wet condition following precipitation, this form of iron oxide readily dissolves in dilute (2.5 to 5 normal) mineral acids (such as hydrochloric, sulfuric, nitric) and also acetic acid.

The yellow form is reported to be crystalline, and to contain a definite proportion of water of constitution, corresponding to the formula $Fe_2O_3.H_2O$. It is more difficultly soluble in dilute mineral acids (2.5 to 5 normal) than the red-brown form, and is particularly resistant to solution in nitric acid in this range of concentration. In this form iron oxide does not exhibit a gel structure.

In the following discussion and examples, references to meta ferric oxide are to be understood as designating the yellow precipitated form, which in the wet condition following precipitation is difficultly soluble in dilute (2.5 to 5 normal) nitric acid and references to ortho ferric oxide designate the precipitated gelatinous red-brown form which is readily soluble.

By controlling the conditions of preparation, we are able to prepare catalysts in which either the ortho or meta form can be made to predominate in substantial amounts in the finished product. This has led to the development of methods of preparing catalysts which are reproducible with respect to their suitability in initiating the desired synthesis. We have now found in particular that a precipitated ferric oxide containing between 5 and 25 percent by weight of the meta form and between 95 and 75 percent by weight of the ortho form (calculated as $Fe_2O_3$) is especially suitable as a catalyst for the production of liquid hydrocarbons by reduction of carbon monoxide with hydrogen; and that the content of the meta form may vary between the approximate limits of 1 and 60 percent by weight without reducing the utility of such a catalyst to a point where it has no practical value for the hydrocarbon synthesis. We have found that catalysts containing very small percentages (1 percent or less by weight) of meta ferric oxide either produce small yields of hydrocarbons or have short life or both and that catalysts containing as much as 60 percent of meta ferric oxide produce a substantially lower yield of hydrocarbons than is obtained when the content of the meta form is in the range of 5 to 25 percent (which range we shall hereinafter designate as the "preferred range") although their useful life may be as long as the useful life of catalysts having the preferred composition.

We have also found that, before conditioning with hydrogen or other reducing gases, our precipitated iron oxide catalysts exhibit ferromagnetic properties. While we believe that ferromagnetism is associated with the superior properties of our catalysts, it will be understood that the specifications of this invention are not intended to demonstrate or further enlarge upon the manner in which these properties are associated.

Catalysts within the scope of our invention may be prepared in accordance with the following general description: An aqueous solution of an alkaline precipitant, as for example, potassium carbonate, which is present in an amount which is in slight excess of the stoichiometric proportion required for precipitation, is added under good agitation to a hot dilute aqueous solution of a ferric salt whereby co-precipitation of the ortho and meta ferric oxides can be made to occur within either the preferred or the wide range of proportions previously mentioned, that is, 5 to 25 percent or 1 to 60 percent by weight of the meta form, respectively. The precipitated material is then washed with water, preferably with distilled water, either by decantation or by any other suitable means, until it contains substantially no more than traces of the salts of the metal employed as the precipitant. The washed precipitated material is dried in any convenient manner as, for example, in an electrically or steam-heated oven at moderately elevated temperatures such as 100 to 150 degrees centigrade until essentially constant weight is attained. At this stage of preparation the catalyst exhibits the physical properties characteristic of a ferric oxide gel. The dried material is crushed either into granules which are graded by screening into sizes suitable for use in the synthesis process or into a fine powder which is then pressed into any desirable shape as, for example, into pellets or tablets such as are commonly employed for catalysts used in the aforementioned hydrocarbon synthesis process.

In general, we have found, in the preparation of our ferric oxide catalyst, that the proportion of meta to ortho ferric oxide (and hence the suitability of the catalyst for the hydrocarbon synthesis) is particularly affected by the temperature of precipitation, by the nature of the chemical reagents used for the preparation, by the concentration of ferric salt in the solution from which ferric oxide is to be precipitated, and by the time consumed in adding the precipitant to the ferric salt solution. We prefer to use solutions of the ferric salt whose concentrations lie between 1.0 and 2.5 moles of salt to 100 moles of water, a time of precipitation which lies between 15 and 45 minutes and a temperature of the precipitating mixture which lies between 70 and 85 degrees centigrade.

While any suitable ferric salt may be employed such as the chloride, sulfate, nitrate, etc., we prefer to use the nitrate. As a precipitant we prefer potassium carbonate; however, the hydroxide, carbonate or bicarbonate of other alkali metals, as well as corresponding ammonium compounds may likewise be used for this purpose.

It will be understood that the scope of our invention is not limited by the reagents and conditions disclosed in the foregoing description, but that we may apply other materials and modifications of physicochemical conditions to obtain mixtures of meta and ortho ferric oxide suitable as catalysts for the hydrocarbon synthesis and it is further obvious that without departing from the spirit and scope of our invention, there will occur to one skilled in the art the possibility of using many variations, both in the preparation and conditioning methods employed for our catalyst as well as in the manner in which the said catalyst is to be used in the hydrocarbon synthesis process.

Thus, instead of decantation, as described above, the precipitate may be separated from soluble salts and other compounds by filtration and washing in any conventional manner. Similarly, under some conditions it may be preferable to dry the washed precipitate in a current of warm air or other gas which is non-reactive with the precipitate.

The following examples will further and more specifically illustrate the nature of the present invention and in what manner the same can be carried out in practice, but it should be understood that the invention is not limited to said examples.

*Example 1*

Materials:
Solution 1. $Fe(NO_3)_3 \cdot 9H_2O$, 1,518 grams in 3 liters water.
Solution 2. $K_2CO_3$ (anhydrous) 856 grams in 1.5 liters water.

Solutions 1 and 2 were made up separately, and heated to 75 degrees centigrade. Solution 2 was then added slowly to Solution 1, with agitation, over a period of 20 minutes, while maintaining the temperature at or near 75 degrees centigrade. At the end of this period, the volume of the slurry was increased to 12 liters by the addition of water at 75 degrees centigrade, the precipitate allowed to settle, and the supernatant liquor withdrawn by decantation. The precipitate was further washed 16 times by decantation over a period of about 2 weeks, approximately 8 liters of wash liquor being withdrawn at each washing. This procedure removed nitrates from the precipitate to such an extent that the wash liquors of the last decantation contained less than 1 part nitrate to 16,000 parts water.

After the washing, the precipitated oxide was filtered, spread upon a plate and air-dried 114 hours at room temperature. It was then placed in an electrically-heated drying oven, heated from room temperature to 149 degrees centigrade in 9½ hours, and held at this temperature 38½ hours longer. After drying, this catalyst was ground to a powder and compressed into pellets about ⅛ inch in diameter and about 3/32 inch long, in which condition it was ready for use. A spectrographic examination showed the presence of potassium, the estimated amount being not over 0.1 percent. Samples of catalyst prepared according to this procedure contain substantially from ten to twenty percent by weight of the meta form.

Catalyst so prepared was conditioned by treatment with a synthesis gas having a ratio of hydrogen to carbon monoxide of 1:1 for about 15 hours at atmospheric pressure and a temperature of 240° C., followed by treatment with a sythesis gas having a ratio of hydrogen to carbon monoxide of 2:1 for an additional 62 hours at the same pressure and temperature. Throughout this period the space velocity was about 150 per hour (N. T. P.). At the end of this period a synthesis gas containing two parts hydrogen to three parts carbon monoxide was passed over the catalyst, at a pressure of from 100–135 pounds per square inch, a temperature of 250° C., and a space velocity of 150 per hour (N. T. P.). For a single pass operation, using a 12-inch bed of the catalyst, over a five week test period the yield of hydrocarbons heavier than butane averaged 66 g. per cubic meter of synthesis gas (N. T. P.). During the third week of this test the yield was about 70 g. per cubic meter of the synthesis gas.

*Example 2*

This was a composite made from two catalysts which were prepared as follows:

*Oxide I.*—Six hundred ninety-four grams of ferric nitrate ($Fe(NO_3)_3 \cdot 9H_2O$) were dissolved in 3 liters of water and ferric oxide was precipitated at 80 degrees centigrade by addition, with agitation, of a solution of 374.7 grams $K_2CO_3$ in suitable concentration in water. The time consumed in adding the precipitant was 20 minutes.

*Oxide II.*—One thousand twelve grams of ferric nitrate ($Fe(NO_3)_3 \cdot 9H_2O$) were dissolved in 3 liters of water and ferric oxide was precipitated at 70 degrees centigrade by the addition, with agitation, of 571 grams of $K_2CO_3$ in suitable concentration in water. The time consumed in adding the precipitant was 20 minutes.

Each of these compositions was dried and pelleted separately and the two were mixed in the proportions of 2 parts by weight of oxide I to 1 part by weight of oxide II, and this mixture was used as such for the hydrocarbon synthesis process.

This modified technique permits the ready preparation of catalysts containing between 5 and 10 percent by weight of the meta form.

This catalyst was conditioned for service by reduction with hydrogen for 24 hours at a maximum temperature of 360 degrees centigrade and then placed under test for a period of 16 weeks in a single pass apparatus. It was operated on a gas mixture consisting of about 1 part hydrogen to 1 of carbon monoxide at 100 pounds per square inch at a temperature of about 250 degrees centigrade and an N. T. P. space velocity of between 150 and 200.

Over this test period and under the above conditions, this catalyst gave an average yield of 60 grams of hydrocarbons heavier than butane per cubic meter of gas passing over it, such gas volume being measured under normal temperature and pressure (N. T. P.), and, excluding the results obtained during the first week of operation, the maximum yield (which was produced by this catalyst during the sixth week of operation) was about 76 grams per cubic meter.

*Example 3*

Materials:
Solution 1. $Fe(NO_3)_3 \cdot 9H_2O$, 607 grams in 2.5 liters water.
Solution 2. KOH, 302 grams in 600 cubic centimeters water.

Solutions 1 and 2 were made up separately and heated to 83 degrees centigrade. Solution 2 was then slowly added to Solution 1 with agitation over a period of 20 minutes, while maintaining the temperature at or near 83 degrees centigrade. At the end of the precipitation, the volume of the slurry was increased to 6 liters by the addition of water, and 17 decantation washings effected over a period of about 2 weeks, approximately 4 liters water being withdrawn at each washing. At the last washing, the nitrate concentration in the wash liquors was less than 1 part in 16,000. After filtration, the project was dried 112 hours at room temperature, then transferred to an electrically-heated oven, heated from room temperature to 151 degrees centigrade in 7½ hours and held at 151 degrees centigrade for 16½ hours longer. After drying, the catalyst was powdered and compressed into pellets in the usual manner.

Analysis of a catalyst whose preparation duplicated in an exact manner the method used for the catalyst of the present example showed a content of 58.5 percent meta ferric oxide by weight.

It was conditioned for service in the same manner as described for the catalyst of Example 1. For the hydrocarbon synthesis, it was used in a single pass apparatus at a pressure of 100 pounds per square inch, with a gas mixture consisting of about 1 part hydrogen to 1 of carbon monoxide at an N. T. P. space velocity of about 150 per hour and a temperature of about 250 degrees centigrade.

Over a test period of 3 weeks this catalyst, under the above conditions, gave an average yield of about 57 grams of hydrocarbons heavier than butane per N. T. P. cubic meter of gas passing over it, and, excluding the results obtained during the first week of operation, the maximum yield (which was produced by this catalyst during the third week of operation) was about 55 grams per cubic meter.

The iron oxide catalysts of our invention may be prepared and used in other ways than as set forth in the foregoing description and examples. For certain operating conditions these catalysts may be supported by a suitable carrier such as silica gel, kieselguhr, diatomaceous earth, clay, bauxite and the like. These catalysts may also be combined with, or used in conjunction with, other catalysts and/or promoters if desired.

The catalyst may likewise be used in other than a fixed bed arrangement. It may be prepared in small particles adapted to be maintained in a state of agitation by passage of reactants and/or reaction products therethrough. In powdered form it may be alternatively employed in so-called "fluid catalyst" operations, that is, suspended in the gases and vapors during the reaction, being separated therefrom and returned to the reaction zone either in admixture with fresh synthesis gas or with the gases recovered from the reaction products and recycled to the reaction zone for further conversion.

According to the provisions of the patent statutes, we have set forth the principles and mode of operation of our invention, and have illustrated and described what we believe to represent its best embodiments. We desire to have it understood, however, that within the scope of the appended claims, the invention may be practiced otherwise than as specifically illustrated and described.

What we claim is:

1. A catalyst for the synthesis of liquid and solid hydrocarbons from hydrogen and carbon monoxide consisting essentially of the reduction products of a mixture of precipitated ferric oxides in which from one to sixty percent by weight is in the meta form, the balance of said oxides being essentially in the ortho form.

2. A catalyst for the synthesis of liquid and solid hydrocarbons from hydrogen and carbon monoxide consisting essentially of the reduction products of a mixture of precipitated ferric oxides in which from five to twenty-five percent by weight is in the meta form, the balance of said oxides being essentially in the ortho form.

3. In a process for the production of liquid and solid hydrocarbons from hydrogen and carbon monoxide, the step of reacting a mixture of hydrogen and carbon monoxide at an elevated temperature and pressure in the presence of an iron oxide catalyst comprising a mixture of ortho- and meta-ferric oxides containing from one to sixty percent of the meta form and from ninety-nine to forty percent of the ortho form.

4. In a process for the production of liquid and solid hydrocarbons from hydrogen and carbon monoxide, the step of passing a mixture of hydrogen and carbon monoxide over an iron oxide catalyst prepared from a mixture of ortho- and meta-ferric oxides containing from five to twenty-five percent of the meta form.

5. In a process for the production of liquid hydrocarbons by the catalytic conversion of a synthesis gas mixture at elevated temperatures and pressures, the improvement which comprises contacting the synthesis gas mixture with an iron oxide catalyst prepared from a mixture of ortho- and meta-ferric oxides containing from five to twenty-five percent of the meta form, by a preliminary treatment with a reducing gas at a pressure lower than the conversion pressure.

6. In a process for the preparation of a catalyst for the synthesis of organic compounds from hydrogen and carbon monoxide mixtures, the improvement which comprises co-precipitating a mixture of hydrated ortho- and meta-ferric oxides from a solution containing from 1.0 to 2.5 moles of a ferric salt per 100 moles of water by the addition thereto of an aqueous solution of a compound of the group consisting of the hydroxide, carbonate and bicarbonate of an alkali metal at a rate such that precipitation is completed within a period of from 15 to 45 minutes, while maintaining the solutions at a temperature in the range of from 70 to 85 degrees centigrade.

7. A process as in claim 6, in which the ferric salt is the nitrate.

8. A process as in claim 6 in which the time of precipitation is about 20 minutes.

9. In a process for the preparation of a catalyst for the synthesis of liquid hydrocarbons from hydrogen and carbon monoxide, the improvement which comprises co-precipitating a mixture of hydrated ortho- and meta-ferric oxides from an aqueous solution of ferric nitrate containing from 1.0 to 2.5 moles of the salt per 100 moles of water by the addition thereto of an aqueous solution of potassium carbonate at a rate such that precipitation is completed over a period of about twenty minutes, while maintaining the solutions at a temperature between 70 and 85 degrees centigrade.

10. A catalyst for the synthesis of liquid and solid hydrocarbons from hydrogen and carbon monoxide consisting essentially of the reduction products of a dehydrated mixture of oxides said mixture, prior to dehydration, being composed essentially of co-precipitated ortho- and meta-ferric oxides, containing from 1 to 60 percent of the meta form.

11. A process for the synthesis of carbon compounds comprising reacting hydrogen with carbon monoxide at an elevated temperature and a superatmospheric pressure in the presence of an active catalyst prepared from a mixture of hydrated ortho- and meta-ferric oxides containing from five to twenty-five percent of the meta form, by dehydrating the said oxide mixture and thereafter conditioning the dehydrated oxides with a mixture of hydrogen and carbon monoxide at a temperature between 200 and 360 degrees centigrade.

12. A process as in claim 11 in which the hydrated ortho- and meta-ferric oxides are co-precipitated.

CHARLES O. HAWK.
NORMA R. STERN.
LAWRENCE J. E. HOFER.

REFERENCES CITED

The following references are of record in the file of this patent:

UNITED STATES PATENTS

| Number | Name | Date |
|---|---|---|
| 1,540,445 | Wilson | June 2, 1925 |
| 1,756,624 | Behrman | Apr. 29, 1930 |
| 2,088,281 | Smith | July 27, 1937 |
| 2,245,157 | Pier | June 10, 1941 |

FOREIGN PATENTS

| Number | Country | Date |
|---|---|---|
| 392,954 | Great Britain | May 22, 1933 |

OTHER REFERENCES

Le Febvre, "Comptes Rendus," vol. 203, pages 1378–80 (1936).

Le Clerc, "Comptes Rendus," vol. 207, pages 1099–110 (1938).

Mellor, Comprehensive Treatise on Inorganic and Theoretical Chemistry, Rongmans 1934, vol. 13, page 859.